United States Patent [19]

Bousquet

[11] Patent Number: 4,677,947
[45] Date of Patent: Jul. 7, 1987

[54] CLAMPED, READILY-REMOVABLE OIL PAN WITHOUT DRAIN HOLE

[76] Inventor: Beaumont Bousquet, 20 Lesgay Crescent, Willowdale, Canada, M2J 2H8

[21] Appl. No.: 880,183

[22] Filed: Jun. 30, 1986

[51] Int. Cl.[4] .............................................. F02F 7/00
[52] U.S. Cl. ............................. 123/195 C; 123/196 R; 184/106
[58] Field of Search ............ 123/195 C, 196 R, 90.38; 184/106

[56] References Cited

U.S. PATENT DOCUMENTS

| | | | |
|---|---|---|---|
| 2,475,836 | 7/1949 | Henricksen et al. | 184/106 |
| 2,837,063 | 6/1958 | Martinez | 123/195 C |
| 3,724,599 | 4/1973 | Heidacker | 123/195 C |
| 4,294,333 | 10/1981 | Little | 123/195 C |

FOREIGN PATENT DOCUMENTS 363657 6/1923 Fed. Rep. of Germany ...... 123/195
2321636 11/1973 Fed. Rep. of Germany ... 123/90.38

Primary Examiner—E. Rollins Cross
Attorney, Agent, or Firm—Riches, McKenzie & Herbert

[57] ABSTRACT

An improved oil pan in combination with an internal combustion engine is disclosed. The oil pan has no drain outlet for permitting lubricating fluid to be drained away. The oil pan must be removed from the engine in order to replace the engine fluid. The oil pan is connected to the underside of the engine by a plurality of clamps such that each clamp applies clamping forces in a direct substantially perpendicular to the line defined by the points where the oil pan contacts the underside of the engine in the region proximate to the clamp.

6 Claims, 11 Drawing Figures

CLAMPED, READILY-REMOVABLE OIL PAN WITHOUT DRAIN HOLE

This invention relates to an improved oil pan with no drain-hole wherein the oil pan is clamped to an internal combustion engine for ready removal.

In a typical prior art internal combustion engine, there is an open underside to which is connected an oil pan. The oil pan is adapted to contain a lubricating fluid which lubricates the internal engine parts. After the lubricating fluid has been used for sometime, it becomes dirty and, to ensure optimum performance, must be replaced.

In the past, the lubricating fluid has always been removed by draining it from a hole, usually in the bottommost region of the oil pan. The drain hole is typically a threaded hole into which is screwed a threaded plug. Unfortunately, the threads in the hole and on the plug often become stripped. If this occurs, the seal between the plug and hole is reduced and the lubricating fluid will drip from the hole. The drip causes a loss of fluid but, perhaps more importantly, if the engine is not moving, such as in a parked automobile, the fluid will drip onto the surface of the parking area usually causing unsightly stains.

SUMMARY OF THE INVENTION

In order to overcome this disadvantage, the present invention provides an oil pan that does not have a drain hole for draining. Therefore, the problem of fluid dripping through the hole is eliminated.

Also, the present invention provides a plurality of readily-releasable clamping means wherein each clamping means applies a force in a direction substantially perpendicular to a line defined as being points where the oil pan contacts the underside of the engine.

Accordingly, in one of its broad aspects, the invention resides in providing in combination in an internal combustion engine an oil pan adapted for readily-removeable connection to an underside of the engine, and a plurality of readily-releasable clamping means wherein the oil pan is adapted to contain a lubricating fluid, the oil pan has an upper opening having an oil pan periphery, the oil pan has no outlet for removing lubricating fluid such that the oil pan must be removed from the underside of the engine in order to replace lubricating fluid in the oil pan, the underside of the engine has a lower opening having an underside periphery, the underside periphery is substantially the same size, shape and configuration as the size, shape and configuration of the oil pan periphery, such that when in combination the oil pan periphery is in contact with substantially all portions of the underside periphery, and each clamping means applies a clamping force in a direction substantially perpendicular to a line defined as being the points where the oil pan periphery contacts the underside periphery in the region proximate to the clamping means.

Further aspects of the invention will become apparent from the following descriptions and the drawings.

BRIEF DESCRIPTION OF THE DRAWINGS

In the drawings, which illustrate embodiments of the invention.

DETAILED DESCRIPTION OF THE INVENTION AND EMBODIMENTS THEREOF

Figure 1:
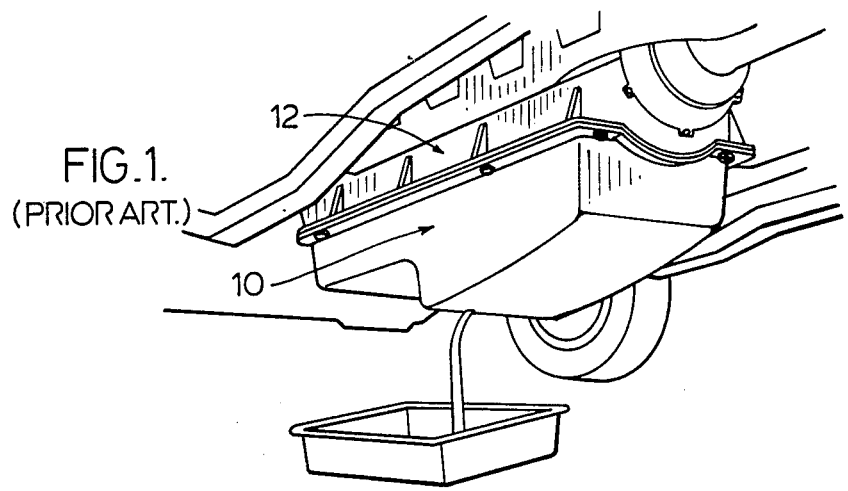
FIG. 1 is a perspective view of a prior art oil pan attached to the underside of an engine.

With reference to FIG. 1, a typical oil pan 10 of the prior art can be seen connected to the underside of an internal combustion engine 12. FIG. 1 shows fluid being drained from the oil pan 10. A drain hole 14 can be seen in the lower most region of the oil pan 10. Also, typical prior art connecting means such as bolts and nuts 16 can be seen.

Figure 2:
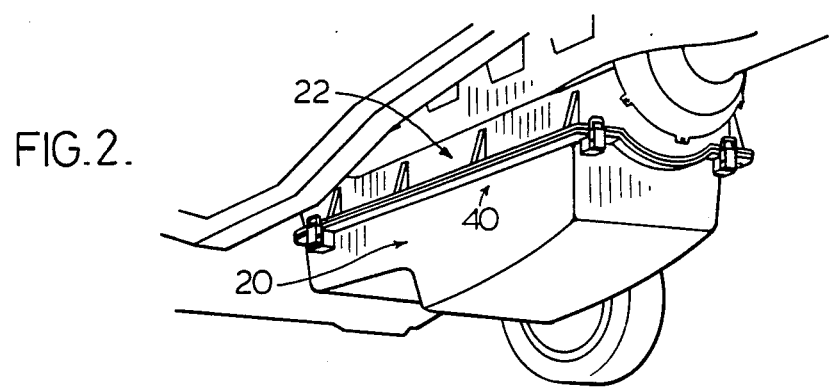
FIG. 2 is a perspective view of an embodiment of the invention.

With reference to FIG. 2, an oil pan 20 of the present invention can be seen in combination with a typical internal combustion engine 22. The oil pan 20 can be made from any suitable material.

Figure 3:
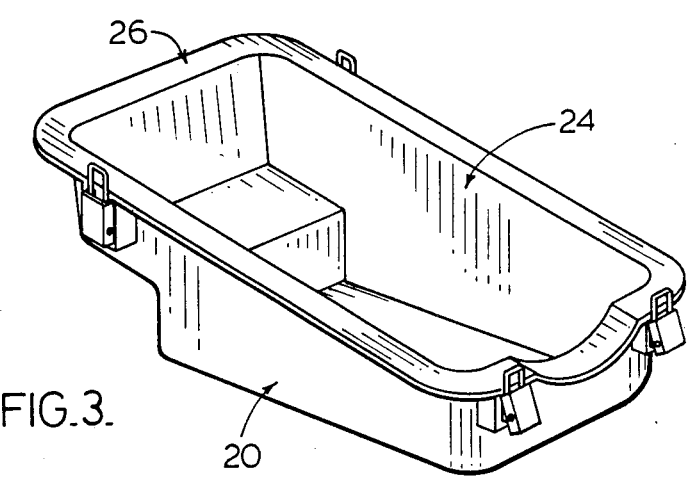
FIG. 3 is a perspective view of an embodiment of an oil pan of the invention.

In an embodiment of the invention, as best seen in FIG. 3, the oil pan 20 has an upper opening 24 in the upper portion thereof. Along the periphery (oil pan periphery) of the upper opening 24 is a flange 26 extending outwardly from the oil pan periphery of the upper opening 24. The flange 26 may be at the same height as the oil pan periphery or, preferably, it could be raised.

Preferably the flange 26 extends at 90° to the oil pan 20 but it is not necessary that this be so. Also, the flange 26 may be slightly angled The oil pan 20 has no hole, opening or outlet for draining lubricating fluid contained within the oil pan 20. It may be that the oil pan 20 had such an opening at one time but the opening has been substantially permenently stopped. Thus, in order to drain the lubricating fluid from the oil pan 20 it is necessary to remove the oil pan 20 from the engine 22.

Figure 4:
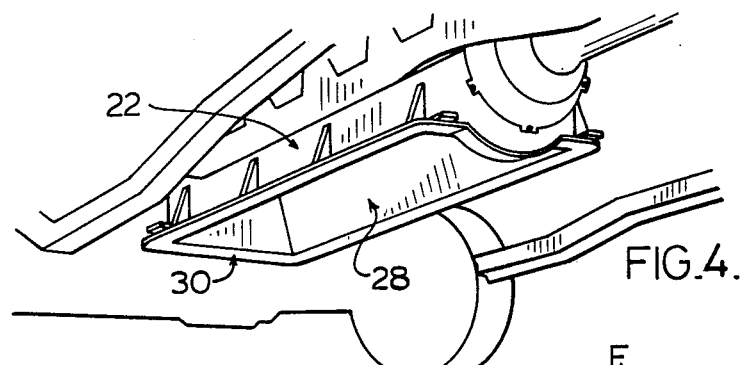
FIG. 4 is a perspective view of an embodiment of an underside of an engine of the invention.

The underside of the engine 22, as best seen in FIG. 4, has a lower opening 28 in the lower portion thereof. Along the periphery (underside periphery) of the lower opening 28 is a flange 30 extending outwardly from the underside periphery. The flange 30 may be at the same height as the underside periphery or, preferably could be lowered.

The flange 30 has substantially the same size, shape and configuration as the flange 26 such that the flanges 26 and 30 will mate together or contact together to form a close fit. Preferably, a gasket (not shown) can be placed between the two flanges 26 and 30 in order to provide a better seal.

The two flanges 26 and 30 are held together by a plurality of readily-releasable clamping means shown generally in FIG. 2 as numerals 40. Preferably the clamping means are spring-biased or cam-biased.

Figure 5:
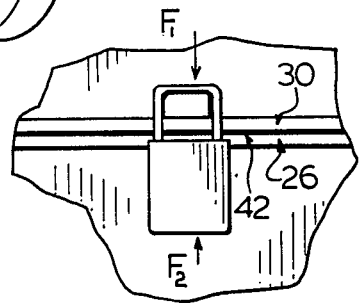
FIG. 5 is a schematic view of the direction of force applied by clamping means of the invention.

As best seen in FIG. 5, each clamping means of the plurality of clamping means applies clamping forces $F_1$ and $F_2$ in a direction which is substantially perpendicular to a line 42 defined as being the line comprising the points where the oil pan periphery contacts the underside periphery in the region proximate to the particular claming means. The line 42 is a local line in the sense that line 42 may be different for each clamping means as the orientation or configuration of the two flanges 26 and 30 might be different in the regions of various clamping means.

Figure 6:
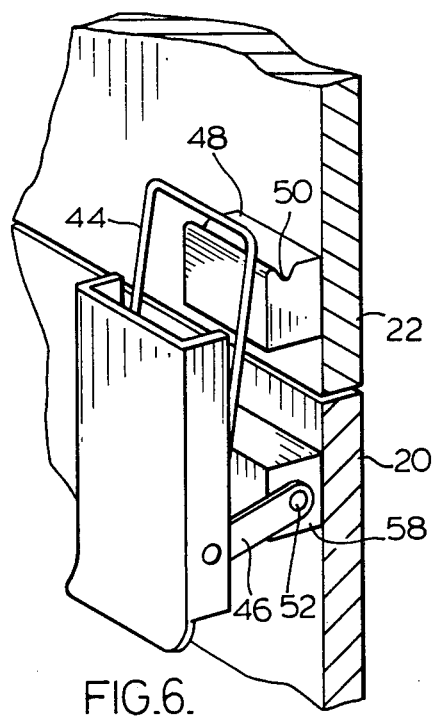
FIG. 6 is a schematic view of an embodiment of a clamping means of the invention.

Preferably, the various clamping means of the invention are each a cam-operated device as generally shown in FIG. 6 in which a rigid loop 44 is hinged to a cam member 46. The cam member 46 is itself hinged at its other end to a first fixed member 58 on one of either the oil pan 20 or the underside 22. The loop 44 is looped around a second fixed member 48 on the other of the oil pan 20 or underside 22. The cam member 46 is then moved in an arc such that the loop 44 is fixed by the second fixed member 48 and is drawn downwards towards the first fixed member 58. In this manner, the oil pan 20 is drawn closer to the underside 22. The loop 44 will "lock" in place when the cam 56 travels past the line defined as the line running from the top 50 of the second fixed member 48 where the loop 44 sits on the second fixed member 48 to the hinged point 52 where the cam 46 is hinged at its end opposite to where the cam 46 is hinged to the loop 44.

The above-described clamping means as shown in FIG. 6 is common in the clamping industry and will be understood by persons skilled in that art.

Figure 7:
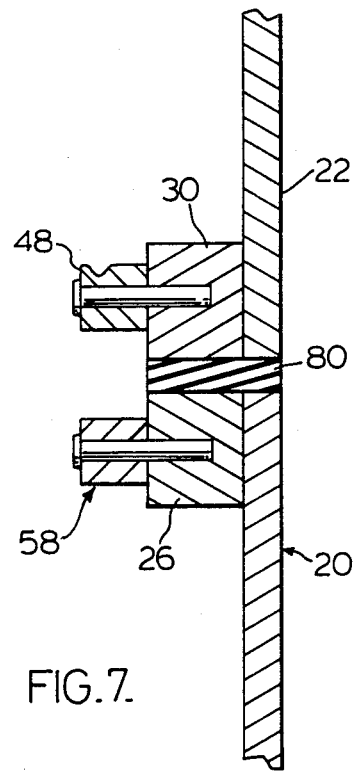
FIG. 7 is a schematic view of an embodiment of a clamping means of the invention.

Preferably, the first fixed member 58 and the second fixed member 48 are connected to one of flanges 26 and 30 such that there are no unnecessary connecting holes in the oil pan 20 or the underside 22 as shown in FIG. 7. A casket 80 is shown between the flanges 30 and 26 in FIG. 7.

The fixed members 48 and 58 can be fixed to the oil pan 20 and the underside 22 provided the connections do not cause undue leakage of lubricating fluid.

An alternative clamping means may be a clamping means similar to the quick-release clamping device found on bicycle hubs. An alternative clamping means might be a spring-biased clamping means.

Figure 8A:
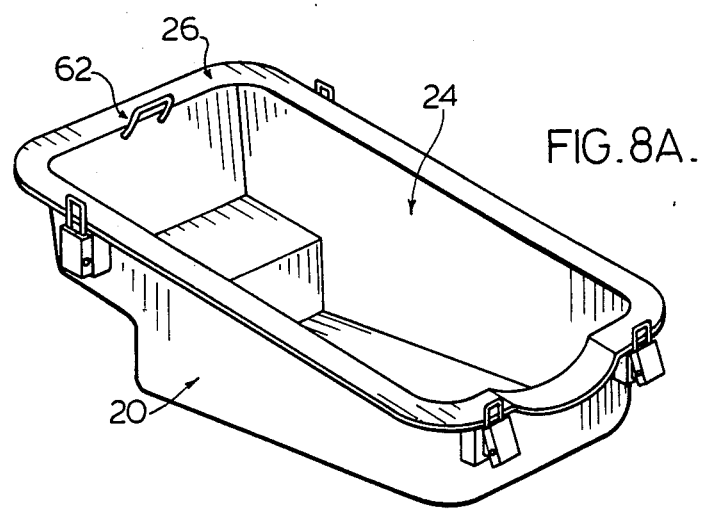
FIGS. 8A and 8B are perspective views of an embodiment of the hook means and hooking means of the invention.
Figure 8B:
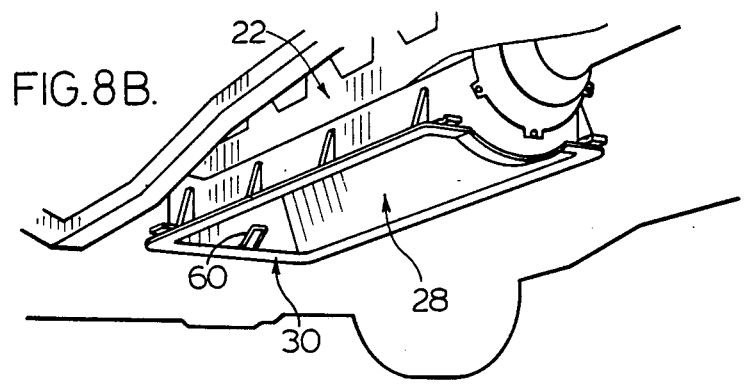

In a further embodiment of the invention, the underside 22 has at least one hook means 60 on either the outer portion of the underside 22 in the region of the underside periphery as shown in FIG. 8. The hook means 60 is used to receive a hooking means 62 which is positioned at a region of the oil pan 20 which corresponds to the region of the hook means 60 on the underside 22. When the hooking means 62 is hooked over the hook means 60 the oil pan 20 can be temporarily suspensed such as when installing or removing the oil pan 20.

Preferably, there is a set of handles (not shown) on the oil pan 20 which can be used to assist to grip the oil pan 20 during installation and removal of the oil pan 20.

Figures 9, 10:
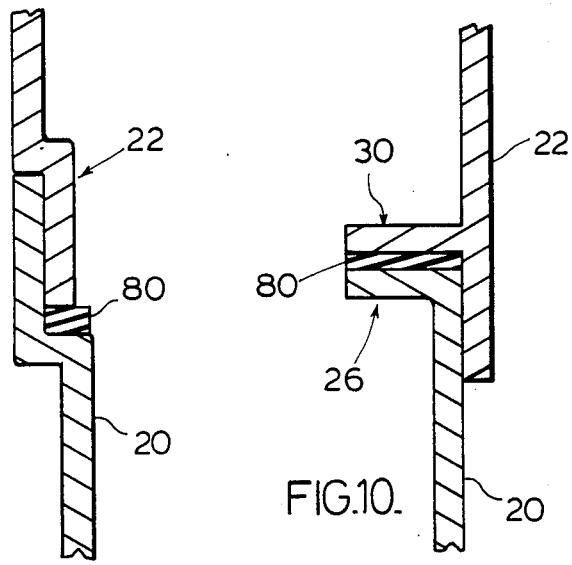
FIG. 9 is an schematic view of an embodiment of an oil pan and an underside of an engine of the invention.
FIG. 10 is a schematic view of an embodiment of an oil pan and an underside of an engine of the invention.

In another embodiment of the invention, it is not necessary that there be flanges 26 and 30. Either the oil pan periphery of the oil pan 20 or the underside periphery of the underside 22 will sit within the periphery of the other of the oil pan 20 or underside 22. Examples of this embodiment are shown in FIGS. 9 and 10. Preferably the periphery has a flange and the entire flange sits within the periphery of the mating part, as shown in FIG. 10.

Although specific embodiments of the invention have been described and illustrated in detail, it will be understood by a person skilled in the art that there are variations of the invention which fall within the scope of the invention.

What I claim is:

1. In combination in an internal combustion engine:
an oil pan adapted for readily-removeable connection to an underside of the engine; and
a plurality of readily-releasable clamping means; wherein:
the oil pan is adapted to contain a lubricating fluid;
the oil pan has an upper opening having an oil pan periphery;
the oil pan has no outlet for removing lubricating fluid such that the oil pan must be removed from the underside of the engine in order to replace lubricating fluid in the oil pan;
the underside of the engine has a lower opening having an underside periphery;
the underside periphery is substantially the same size, shape and configuration as the size, shape and configuration of the oil pan periphery, such that when in combination the oil pan periphery is in contact with substantially all portions of the underside periphery;
each clamping means applies a clamping force in a direction substantially perpendicular to a line defined as being the points where the oil pan periphery contacts the underside periphery in the region proximate to the clamping means; and
the clamping force of each clamping means is obtained by means other than bolts or screws.

2. The combination as defined in claim 1 wherein the oil pan has an oil pan flange extending from the oil pan periphery;
the underside has an underside flange extending from the underside periphery and
the oil pan flange is substantially the same size, shape and configuration as the size, shape and configuration of the underside flange.

3. A combination as defined in claim 2 wherein the underside has at least one hook means in a region of the underside periphery, and the oil pan has at least one hooking means adapted to hook over the corresponding at least one hook means so as to be capable of temporarily suspending the oil pan in the region of the hook means.

4. A combination as defined in claim 2 wherein either of the oil pan periphery or the underside periphery has a shoulder therearound and the other of the oil pan periphery or the underside periphery contacts against the shoulder.

5. A combination as defined in claim 1 wherein each clamping means is a cam-operated clamping means comprising:
a rigid loop;
a cam member having a first end and a second end;
a first fixed member;
a second fixed member;
wherein the first fixed member is fixed to the oil pan at a region proximate the oil pan periphery;
wherein the second fixed member is fixed to the underside at a region proximate the underside periphery, and the second fixed member is proximate to the first fixed member;

wherein the first end of the cam-member is hinged to either the first fixed member or the second fixed member;

wherein the second end of the cam-member is hinged to the rigid loop; and wherein the rigid loop is adapted to loop over the fixed member to which the cam-member is not hinged, and to be locked in place by an arcing movement of the cam-member.

6. A combination as defined in claim 2 wherein the first fixed member is fixed to the flange extending from the oil pan periphery and the second fixed member is fixed to the flange extending from the underside periphery.

* * * * *